(12) United States Patent
Kamei et al.

(10) Patent No.: US 11,639,680 B2
(45) Date of Patent: May 2, 2023

(54) UREA WATER SUPPLY SYSTEM

(71) Applicant: DENSO CORPORATION, Kariya (JP)

(72) Inventors: Tomoaki Kamei, Kariya (JP); Tomohiro Ueno, Kariya (JP); Eiji Takemoto, Kariya (JP); Sumitaka Ikeda, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/587,431

(22) Filed: Jan. 28, 2022

(65) Prior Publication Data
US 2022/0251988 A1    Aug. 11, 2022

(30) Foreign Application Priority Data
Feb. 8, 2021 (JP) ............... JP2021-018269

(51) Int. Cl.
*F01N 3/20* (2006.01)
*B01D 53/94* (2006.01)

(52) U.S. Cl.
CPC ......... *F01N 3/208* (2013.01); *B01D 53/9418* (2013.01); *B01D 53/9431* (2013.01); *B01D 53/9495* (2013.01); *F01N 2560/08* (2013.01); *F01N 2610/02* (2013.01); *F01N 2610/144* (2013.01); *F01N 2610/1406* (2013.01); *F01N 2610/1433* (2013.01); *F01N 2610/1453* (2013.01); *F01N 2900/1808* (2013.01); *F01N 2900/1811* (2013.01); *F01N 2900/1818* (2013.01); *F01N 2900/1822* (2013.01)

(58) Field of Classification Search
CPC combination set(s) only.
See application file for complete search history.

(56) References Cited

U.S. PATENT DOCUMENTS

| | | | |
|---|---|---|---|
| 9,765,674 B2* | 9/2017 | Khaled | B01D 53/9418 |
| 10,787,945 B2* | 9/2020 | Landwehr | B01D 53/9431 |
| 2015/0361857 A1* | 12/2015 | Matsuo | F01N 3/2066 60/303 |
| 2015/0361858 A1* | 12/2015 | Matsuo | F01N 3/2066 60/303 |
| 2017/0087515 A1* | 3/2017 | Huang | B01D 53/9495 |
| 2017/0350290 A1* | 12/2017 | Yang | F01N 3/2066 |
| 2018/0087426 A1* | 3/2018 | Dou | F01N 9/002 |

* cited by examiner

*Primary Examiner* — Binh Q Tran
(74) *Attorney, Agent, or Firm* — Nixon & Vanderhye P.C.

(57) ABSTRACT

A urea water supply system includes: a first supply valve for supplying urea water; a second supply valve for supplying urea water; a supply passage for connecting a urea water tank and the first and the second supply valves; and an electronic control unit (ECU). The supply passage branches to have a first supply passage extending from a branch point to the first supply valve and a second supply passage extending from the branch point to the second supply valve, and a volume of the first supply passage is greater than a volume of the second supply passage. The ECU opens the first supply valve while keeping the second supply valve closed, for starting filling of the supply passage with urea water, and thereafter determines completion of filling of urea water into the first supply passage.

21 Claims, 9 Drawing Sheets

UREA WATER PUMP

UREA WATER PRESSURE VALUE

1ST SUPPLY VALVE

2ND SUPPLY VALVE

REMAINING AIR AMOUNT

UREA WATER PUMP

UREA WATER PRESSURE VALUE

UREA WATER PRESSURE CHANGE AMOUNT

1ST SUPPLY VALVE

2ND SUPPLY VALVE

REMAINING AIR AMOUNT

UREA WATER SUPPLY SYSTEM

CROSS REFERENCE TO RELATED APPLICATION

The present application is based on and claims the benefit of priority of Japanese Patent Application No. 2021-018269, filed on Feb. 8, 2021, the disclosure of which is incorporated herein by reference.

TECHNICAL HELD

The present disclosure generally relates to a urea water supply system that supplies urea water.

BACKGROUND INFORMATION

In a comparative example, a Selective Catalytic Reduction (SCR) catalyst is known as one of the typical NOx purification catalysts used for purifying nitrogen oxides (NOx) and the like contained in the exhaust gas of an internal combustion engine. Ammonia (NH3) or the like is supplied to the SCR catalyst as a reducing agent for purifying NOx.

In such a urea water supply system, if the volume of the supply passage to each of the supply valves is different, a problem of urea water supply due to excess or lack of filling of urea water may occur.

SUMMARY

It is an object of the present disclosure to provide a urea water supply system capable of appropriately filling a supply passage with urea water.

BRIEF DESCRIPTION OF DRAWINGS

Objects, features, and advantages of the present disclosure will become more apparent from the following detailed description made with reference to the accompanying drawings, in which.

DETAILED DESCRIPTION

Figure 1:
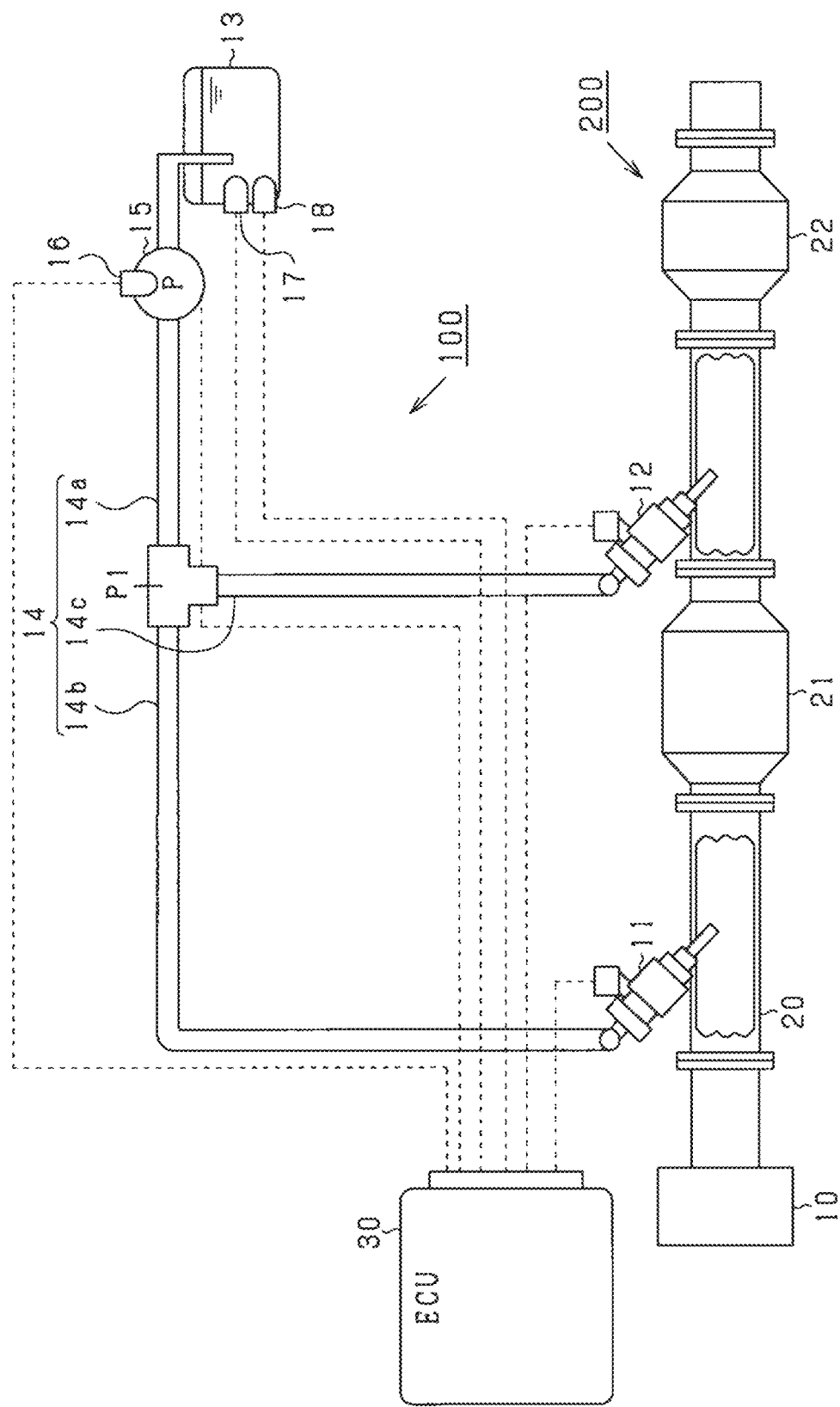
FIG. 1 is a schematic view of an exhaust gas purification device and a urea water supply system.

Hereinafter, embodiments respectively describing a urea water supply system are discussed with reference to the drawings. In the following embodiments, parts that are the same as or equivalent to each other are denoted by the same reference numerals in the drawings, and a description of such parts denoted by the same reference numerals in one of the embodiments is commonly referred to.

First Embodiment, FIGS. 1-5

As shown in FIG. 1, a urea water supply system 100 for a vehicle is mounted on the vehicle and applied to an exhaust gas purification device 200 of the vehicle. The vehicle includes an internal combustion engine 10 and an exhaust passage 20 of the internal combustion engine 10. The internal combustion engine 10 may be a diesel engine or a gasoline engine.

The exhaust purification device 200 includes a first catalyst 21 of a selective reduction type that uses ammonia to purify nitrogen oxides (NOx) in the exhaust gas, and a second catalyst 22 of a selective reduction type that uses ammonia to similarly purify nitrogen oxides (NOx) in the exhaust gas. The exhaust gas purification device 200 is provided in the exhaust passage 20, in which the first catalyst 21 is provided in downstream of the internal combustion engine 10 and the second catalyst 22 is provided in downstream of the first catalyst 21 in series.

Although not shown in FIG. 1, an oxidation catalyst having an oxidizing function and a filter for collecting particulate matter in the exhaust gas may be provided in upstream of the first catalyst 21. Further, an oxidation catalyst having an oxidizing function and a filter for collecting particulate matter in the exhaust gas may be provided in downstream of the first catalyst 21 and in upstream of the second catalyst 22. Further, although not shown in FIG. 1, an oxidation catalyst (ASC catalyst) for oxidizing ammonia slipping from the first catalyst 21 or the second catalyst 22 may also be provided in downstream of the first/second catalyst 21, 22.

The urea water supply system 100 includes a first supply valve 11 arranged in upstream of the first catalyst 21 in the exhaust passage 20, and a second supply valve 12 arranged in downstream of the first catalyst 21 and in upstream of the second catalyst 22. Further, the urea water supply system 100 includes a urea water tank 13 for storing urea water, a supply passage 14 through which urea water passes/flows, a pump 15 for pumping urea water, a pressure sensor 16 for detecting a pressure of urea water. Further, the urea water supply system 100 includes a urea water temperature sensor 17 and a urea water concentration sensor 18 in the urea water tank 13. Further, the urea water supply system 100 includes an ECU (Electronic Control Unit) 30 as a controller that performs various controls.

The first supply valve 11 supplies urea water, which is a precursor of ammonia, to the upstream of the first catalyst 21 in the exhaust passage 20. The urea water supplied by the first supply valve 11 is thermally decomposed and hydrolyzed by the heat of the exhaust gas to generate ammonia. The ammonia flows into the first catalyst 21 and is adsorbed there, so that a reduction reaction between ammonia and NOx in the exhaust gas occurs, and NOx is purified.

The second supply valve 12 supplies urea water, which is a precursor of ammonia, to the upstream of the second catalyst 22 in the exhaust passage 20. The urea water supplied by the second supply valve 12 purifies NOx as described above.

The supply passage 14 is provided to connect the urea water tank 13 with each of the first supply valve 11 and the second supply valve 12. The supply passage 14 is branched in the middle, i.e., at a position between two ends thereof, into a common passage 14a provided/extending from the urea water tank 13 to the branch point P1 and a first supply passage 14b provided/extending from the branch point P1 to the first supply valve 11 and a second supply passage 14c provided/extending from the point P1 to the second supply valve 12. The volume of the first supply passage 14b is configured to be greater than the volume of the second supply passage 14c.

The pump 15 is provided in the common passage 14a, and is configured to pump urea water from the urea water tank 13 and pump, i.e., pressure and flow, urea water from the urea water tank 13 to the supply passage 14.

The pressure sensor 16 detects a pressure value of urea water pumped from the pump 15, that is, the pressure value of the urea water in the supply passage 14. The urea water temperature sensor 17 detects temperature of urea water stored in the urea water tank 13. The urea water concentration sensor 18 detects concentration of urea water stored in the urea water tank 13.

The ECU 30 is an electronic control device including a microcomputer or the like made up of a well-known CPU, ROM, RAM, or the like. The ECU 30 has various functions, and the various functions are realized by executing a program stored in a ROM or the like included in the ECU 30. The various functions may be realized by electronic circuits that are hardware, or at least a part of them may be realized by software, that is, processing executed on a computer.

The ECU 30 has, for example, a function as a drive controller that performs drive control of the pump 15 and a function as an open/close controller that performs open/close control of the first supply valve 11 and the second supply valve 12. Various functions of the ECU 30 are described later. The ECU 30 is connected to the pressure sensor 16, the urea water temperature sensor 17, and the urea water concentration sensor 18, and inputs the detection results thereof. Then, the ECU 30 performs various functions based on the detection results.

The urea water supply system 100 supplies urea water to the exhaust passage 20 to purify NOx contained in the exhaust gas discharged during the operation (i.e., combustion) of the internal combustion engine 10. Here, if urea water remains in the supply valves 11 and 12 and the supply passage 14 while the internal combustion engine 10 is stopped, the remaining urea water freezes and the volume expands, thereby possibly damaging the supply valves 11, 12 and the supply passages. It is also conceivable that the remaining urea water generates ammonia to corrode the supply valves 11 and 12, the supply passage 14, and the like. Therefore, the ECU 30 of the urea water supply system 100 implements suction control to suck back the urea water remaining in the supply valves 11 and 12 and the supply passage 14 to the urea water tank 13 when the operation of the internal combustion engine 10 is stopped. Specifically, the ECU 30 drives the pump 15 in the reverse rotation with the supply valves 11 and 12 opened to pump the urea water in the supply passage 14 back to the urea water tank 13. As a result, the inside of the supply passage 14 becomes empty, that is, filled with air.

Further, the urea water supply system 100 implements a filling control for filling the supply valves 11 and 12 and the supply passage 14 with urea water when the operation of the internal combustion engine 10 is started. At such timing, it is desirable to fill the volume of the supply valves 11 and 12 and the supply passage 14 with urea water in just proportion. That is, if urea water is excessively filled with respect to the volume, or capacity thereof, it leads to leakage of urea water, and if urea water is insufficient, air remains therein, which leads to a decrease of the injection amount, and/or to a decrease of the pressure during injection.

Figure 2:
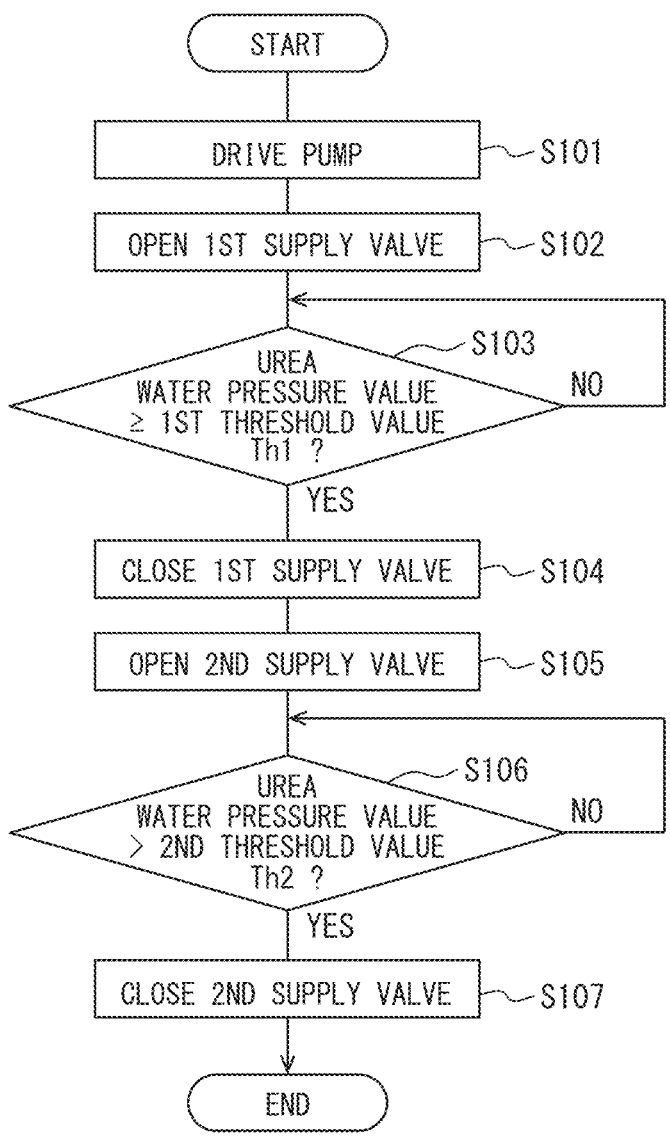
FIG. 2 is a flowchart showing a flow of a filling process.

Therefore, in the first embodiment, a filling process related to the filling control is performed as shown in FIG. 2. Hereinafter, a detailed description is provided with reference to FIG. 2. The filling process is performed by the ECU 30 at a predetermined timing (for example, at the start of operation of the internal combustion engine 10).

When the filling process is started, the ECU 30 drives the pump 15 in a forward rotation to pump urea water from the pump 15 to the supply passage 14 (step S101). Next, the ECU 30 opens the first supply valve 11 while keeping the second supply valve 12 closed (step S102). As a result, urea water pumped from the pump 15 is filled in the common passage 14a and the first supply passage 14b. At such timing, since the second supply valve 12 is closed, remaining air is present inside the second supply passage 14c.

Figure 3A:
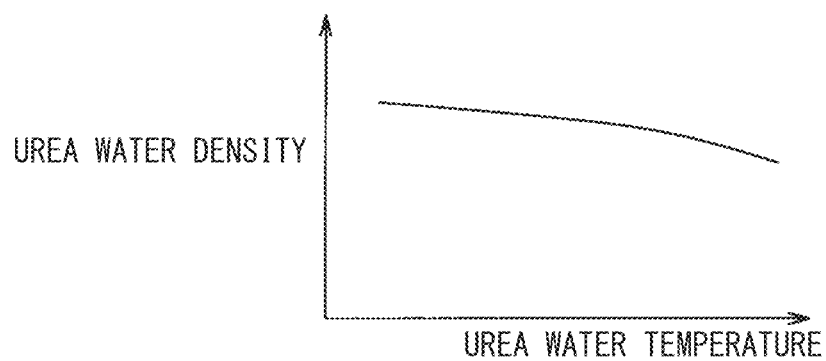
FIG. 3A is a diagram showing a relationship between urea water temperature and urea water density.
Figure 3B:
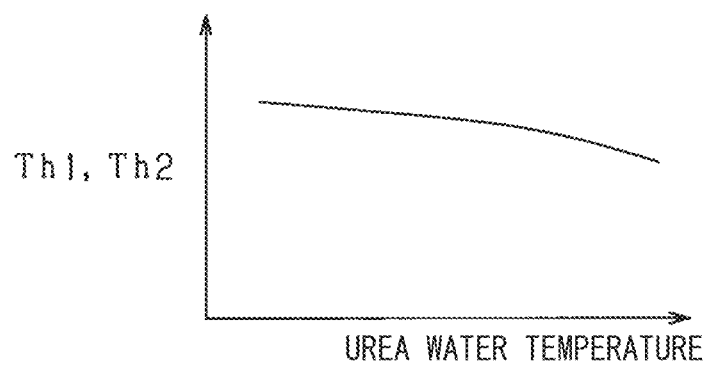
FIG. 3B is a diagram showing a relationship between urea water temperature and a threshold value.

Next, the ECU 30 receives an input of a pressure value of the urea water detected by the pressure sensor 16, and determines whether or not the pressure value of urea water is equal to or higher than a first threshold value Th1 (step S103). Note that, as shown in FIG. 3A, the urea water density decreases as urea water temperature increases. Then, when the urea water density decreases, a flow speed of urea water decreases, and a pressure loss in the piping of the urea water decreases. Therefore, if the first threshold value Th1 is set as a constant value, an error may occur in the determination. Therefore, as shown in FIG. 3B, the first threshold value Th1 is changed by the ECU 30 to decrease as the urea water temperature increases, similar to the urea water density.

Figure 4A:
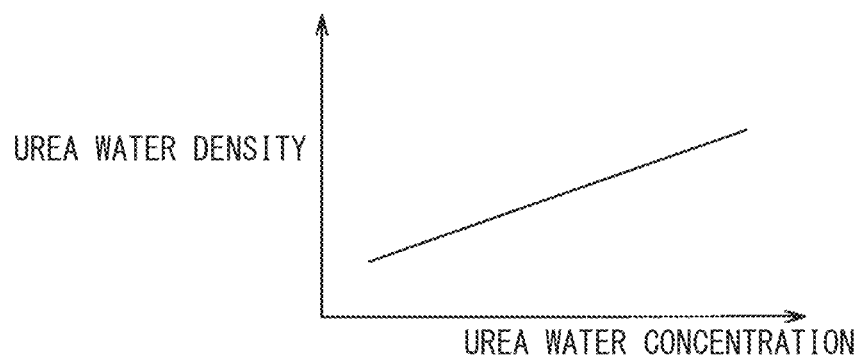
FIG. 4A is a diagram showing the relationship between urea water concentration and the urea water density.
Figure 4B:
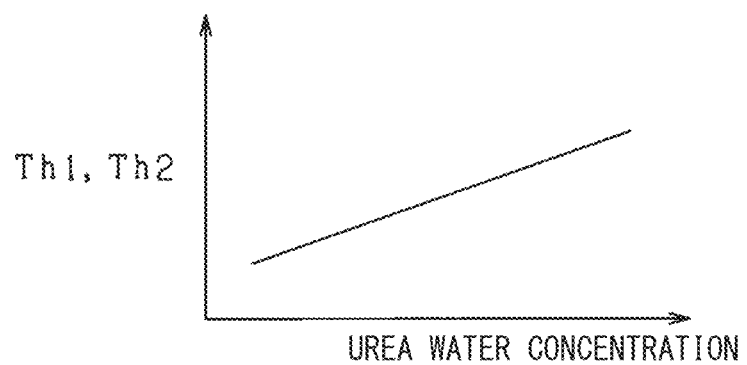
FIG. 4B is a diagram showing a relationship between the urea water concentration and a threshold value.

Further, as shown in FIG. 4A, the urea water density increases in proportion to the urea water concentration. Then, when the urea water density increases, the flow speed of the urea water increases, and the pressure loss in the piping of the urea water increases. Therefore, if the first threshold value Th1 is set as a constant value, an error may occur. Therefore, as shown in FIG. 4B, the first threshold value Th1 is changed by the ECU 30 to be proportional to the urea water concentration.

If the determination result in step S103 is negative (NO), the ECU 30 performs step S103 again after a certain period of time has elapsed. That is, the ECU 30 waits until the pressure value of the urea water reaches the first threshold value Th1.

On the other hand, if the determination result in step S103 is affirmative (YES), the ECU 30 closes the first supply valve 11 (step S104) and opens the second supply valve 12 (step S105). As a result, the remaining air inside the second supply passage 14c is discharged to the exhaust passage 20 through the second supply valve 12, and the second supply passage 14c is filled with urea water.

Next, the ECU 30 receives an input of the pressure value of the urea water detected by the pressure sensor 16, and determines whether or not the pressure value of the urea water is greater than a second threshold value Th2 (step S106). A value equal to or higher than the first threshold value Th1 is set for the second threshold value Th2. Further, the second threshold value Th2 is changed by the ECU 30 according to the urea water temperature and the urea water concentration, similarly to the first threshold value Th1.

If such determination result is negative (NO), the ECU 30 performs step S106 again after a certain period of time has elapsed. That is, the ECU 30 waits until the pressure value of the urea water becomes greater than the second threshold value Th2. On the other hand, if the determination result in step S106 is affirmative (YES), the ECU 30 closes the second supply valve 12 (step S107), and ends the filling process.

Figure 5A:
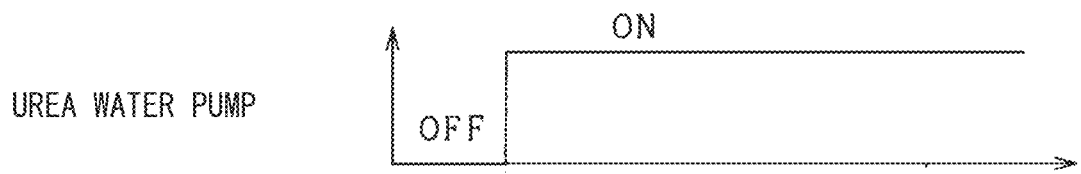
FIG. 5A is a time chart showing a drive state of a pump.
Figure 5B:
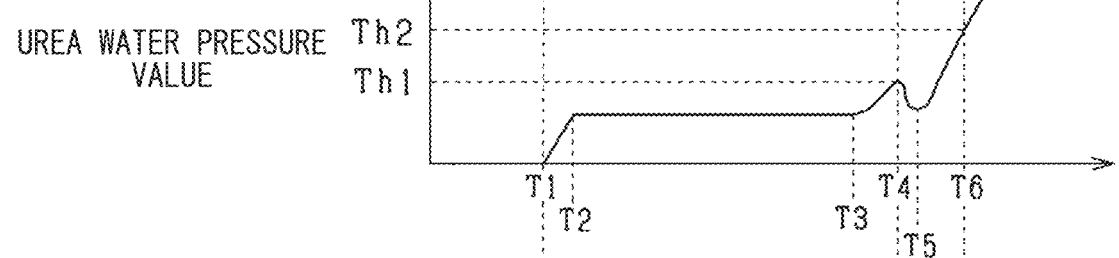
FIG. 5B is a time chart showing a urea water pressure value.
Figure 5C:
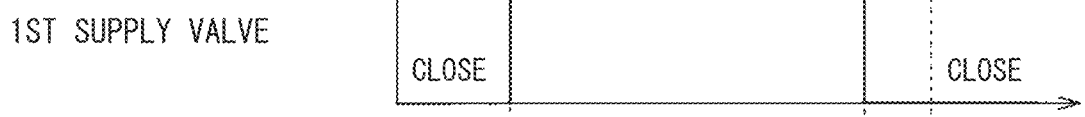
FIG. 5C is a time chart showing an open/close mode of a first supply valve.
Figure 5D:
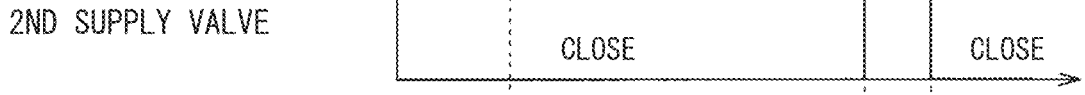
FIG. 5D is a time chart showing the open/close mode of the second supply valve.
Figure 5E:
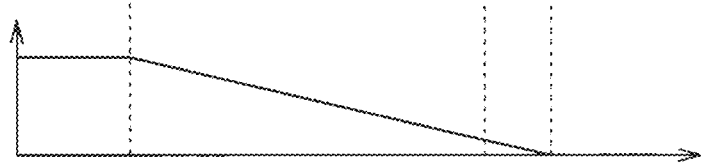
FIG. 5E is a time chart showing the transition of remaining air amount.

Next, the effects of the filling process are described with reference to FIGS. 5A to 5E. FIG. 5A is a time chart showing a drive state (forward rotation drive) of the pump 15, and FIG. 5B is a time chart showing a pressure value of urea water. FIG. 5C is a time chart showing an open/close mode of the first supply valve 11, and FIG. 5D is a time chart showing an open/close mode of the second supply valve 12. FIG. 5E is a time chart showing transition of a remaining air amount inside the supply passage 14.

As shown in FIGS. 5A to 5E, when the pump 15 is driven at timing T1 and the first supply valve 11 is opened, the pressure value of the urea water rises as the common passage 14a and the first supply passage 14b are filled with urea water. Then, the pressure value becomes constant (after timing T2). On the other hand, air is discharged from the supply passage 14 through the first supply valve 11, and the amount of remaining air in the supply passage 14 is reduced.

After that, when the filling of the urea water in the first supply valve 11 and the first supply passage 14b is complete (at timing T3), the pressure value of the urea water gradually increases. At such timing, urea water flows into the second supply passage 14c while compressing the remaining air in the second supply passage 14c.

When the pressure value of the urea water becomes equal to or greater than the first threshold value Th1 (at timing T4), the first supply valve 11 is closed while the second supply valve 12 is opened. As a result, the urea water flows into the second supply passage 14c so that the urea water fills the second supply valve 12 and the second supply passage 14c. At such timing, the remaining air in the second supply passage 14c is pushed out from the supply passage 14 to the exhaust passage 20 via the second supply valve 12 by the urea water, and the amount of remaining air in the supply passage 14 is reduced. At such timing, the pressure of the urea water temporarily decreases.

Thereafter, when the filling of the urea water in the second supply valve 12 and the second supply passage 14c is complete (at timing T5), the urea water loses an escape space and the pressure value of the urea water rises. When the pressure value of the urea water becomes greater than the second threshold value Th2 (at timing T6), the second supply valve 12 is closed. In such manner, the filling of the supply passage 14 with urea water is complete. At such timing, the urea water is filled in the supply passage 14 while maintaining a pressure state suitable for injection.

Now, as described above, at timing T3 when the filling of urea water is complete in the first supply valve 11 and the first supply passage 14b, air remains inside the second supply passage 14c. When the filling of the urea water into the first supply passage 14b is complete, the urea water also flows into the second supply passage 14c, where, since the second supply valve 12 is closed, remaining air in the second supply passage 14c is compressed by urea water flowing thereinto. Further, since the volume of air is more likely to change (i.e., is easily compressed) than that of urea water, if air remains, remaining air serves as an error factor, i.e., causes a detection error of the pressure value of urea water.

Here, for example, when the volume of the second supply passage 14c is greater than the volume of the first supply passage 14b, it leads to a greater amount of the remaining air in comparison to a case in which the volume of the second supply passage 14c is smaller (that is, in the case of the present embodiment), which tends to cause a greater detection error. As a result, even though the filling of the first supply passage 14b is complete, the pressure value of the urea water may easily be detected as a low value, i.e., lower than actual pressure, due to the remaining air, and there is a possibility that the urea water is excessively supplied for causing a leak of the urea water.

Therefore, in the present embodiment, the volume of the second supply passage 14c is made smaller than the volume of the first supply passage 14b, and, the first supply valve 11 is opened first for firstly filling the first supply passage 14b with urea water, then the second supply valve 12 is opened for subsequently filling the second supply passage 14c with urea water. In such manner, the amount of remaining air is reducible at the time when the filling of the urea water into the first supply passage 14b is complete, and the detection error of the pressure value of the urea water is reducible when making determination based on the first threshold value Th1.

It is also conceivable to open both the first supply valve 11 and the second supply valve 12 from the start of filling. However, in such case, even if the filling of the second supply passage 14c having a small volume with urea water is complete, the urea water flows into the first supply passage 14b while pushing out the air in the first supply passage 14b, thereby making the rise in pressure value small and difficult to detect. Therefore, if the determination threshold value of the pressure value of the urea water is set as a greater value, the urea water may be excessively filled, and a problem that the urea water easily leaks may occur. On the other hand, if the determination threshold value of the pressure value of the urea water is decreased, it may easily be affected by a slight pressure fluctuation, causing a problem that an erroneous determination may be made due to the influence of a slight clogging, for example. Therefore, it can be said that the method of opening both the first supply valve 11 and the second supply valve 12 from the start of filling is not appropriate.

The following advantageous effects can be obtained by the first embodiment described above.

The ECU 30 opens the first supply valve 11 with the second supply valve 12 kept closed, and drives the pump 15 to pump urea water to start filling the supply passage 14 with urea water. Thereafter, the ECU 30 determines that the urea water has been filled into the first supply passage 14b based on the pressure value detected by the pressure sensor 16, and closes the first supply valve 11.

As a result, the amount of air remaining inside the second supply passage 14c is reducible at timing T3 when the filling of the first supply valve 11 and the first supply passage 14b with urea water is complete. That is, in other words, as compared with the case where the urea water is first filled into the second supply passage 14c having a small volume, firstly filling the first supply passage 14b having a large volume with the urea water as shown in the present embodiment enables more effective reduction of the amount of air remaining in the supply passage 14. Therefore, the detection error of the pressure value of the urea water is reducible, and the completion of filling the urea water into the first supply passage 14b can be accurately determined. Thus, overfilling of urea water into the supply passage and urea water leakage are both preventable.

The ECU 30 closes the first supply valve 11 and at substantially the same time opens the second supply valve 12 to start filling the second supply passage 14c with urea water. Therefore, the time from the start of filling to the completion of filling (time related to the filling process) is reducible as compared with the case where the second supply valve 12 is opened after a predetermined time has elapsed from closing the first supply valve 11.

After opening the first supply valve 11, the ECU 30 closes the first supply valve 11 when the pressure value of the urea water is equal to or higher than the first threshold value Th1. After opening the second supply valve 12, the ECU 30 closes the second supply valve 12 when the pressure value of the urea water is greater than the second threshold value Th2. In addition, the second threshold value Th2 is equal to or higher than the first threshold value Th1. Thereby, the completion of filling the first supply passage 14b and the completion of filling the second supply passage 14c can both be appropriately determined.

The first threshold value Th1 and the second threshold value Th2 are changed according to the temperature of urea water and concentration of urea water. Therefore, even if the temperature or concentration of urea water changes, the completion of filling can be appropriately determined.

Figure 6:
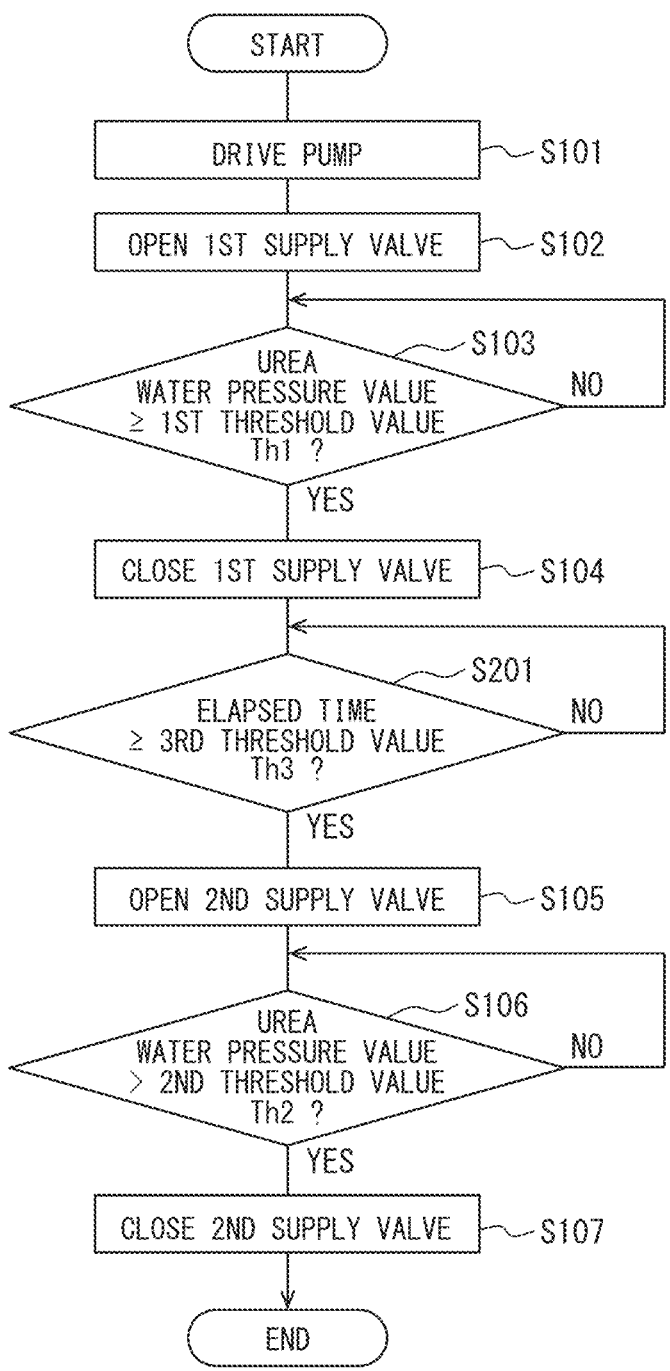
FIG. 6 is a flowchart showing a flow of a filling process according to the second embodiment.

Second Embodiment, FIG. 6

The urea water supply system 100 of the first embodiment may partially be modifiable. The urea water supply system 100 of the second embodiment is described in the following. In the second embodiment, the basic configuration thereof is described based on the first embodiment.

The filling process in the second embodiment is described with reference to FIG. 6. The filling process is performed by the ECU 30 at a predetermined timing (for example, at the start of operation of the internal combustion engine 10). When the filling process is started, the ECU 30 performs steps S101 to S104 as in the first embodiment.

After performing step S104, the ECU 30 determines whether or not the elapsed time since closing the first supply valve 11 is equal to or greater than a third threshold value Th3 corresponding to a predetermined time (step S201). If the determination result is negative (NO in S201), the ECU 30 again performs step S201 after a certain period of time has elapsed. That is, the ECU 30 waits until a predetermined time elapses after the first supply valve 11 is closed.

The third threshold value Th3 is set to a duration of time that allows the urea water flowing into the second supply passage 14c to reach the second supply valve 12 after the first supply valve 11 is closed, in consideration of difference of volumes between the first supply passage 14b the second supply passage 14c and viscosity of the urea water.

Figure 7:
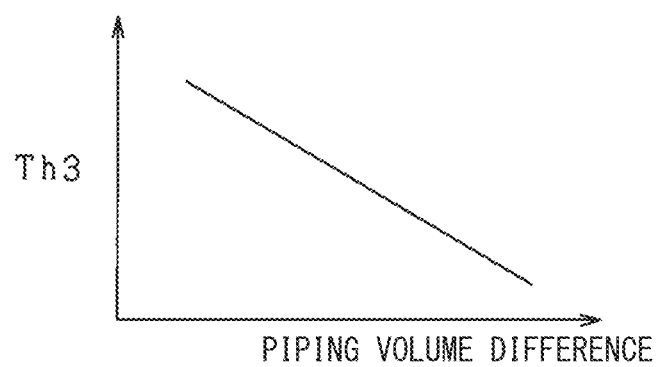
FIG. 7 is a diagram showing a relationship between a pipe volume difference and a third threshold value.

More specifically, the value of the third threshold value Th3 is set based on the volume difference between the first supply passage 14b and the second supply passage 14c. That is, as shown in FIG. 7, the greater the volume difference (PIPING VOLUME DIFFERENCE in FIG. 7) is, the smaller the third threshold value Th3 is set. Such a configuration is based on the consideration that, the greater the volume of the first supply passage 14b is, the longer the time it takes to fill the first supply passage 14b with urea water, and during such time, a part of the urea water easily flows into the second supply passage 14c. Also, such a configuration is based on the consideration that, the smaller the volume of the second supply passage 14c is, the shorter the time it takes for urea water flowing into the second supply passage 14c after closure of the first supply valve 11 to reach the second supply valve 12. Based on such consideration, as shown in FIG. 7, the greater the volume difference, the smaller the third threshold value Th3 is set.

Figure 8A:
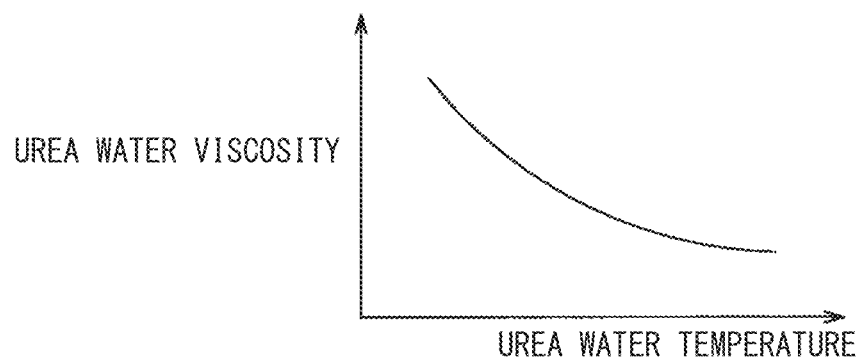
FIG. 8A is a diagram showing a relationship between urea water temperature and urea water viscosity.

Further, as shown in FIG. 8A, viscosity of the urea water decreases in inverse proportion to urea water temperature. That is, the lower the urea water temperature is, the higher the urea water viscosity becomes. Further, it is known that (a) when urea water temperature is high and the urea water viscosity is low, it becomes easy for urea water to flow, while (b) when urea water temperature is low and the urea water viscosity is high, it becomes hard for urea water to flow. Therefore, it may be desirable to change the third threshold value Th3 according to urea water temperature.

Figure 8B:
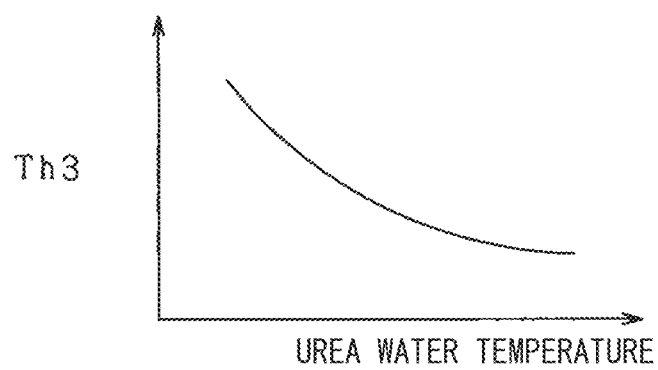
FIG. 8B is a diagram showing a relationship between urea water temperature and a third threshold value.

Specifically, it is desirable to change the third threshold value Th3 to have a greater value as urea water temperature lowers, and to change the third threshold value Th3 to have a smaller value as urea water temperature rises. Therefore, as shown in FIG. 8B, the ECU 30 changes the third threshold value Th3 to have a greater value (i.e., setting a longer duration as Th3) as urea water temperature lowers.

If the determination result in step S201 is affirmative (YES), the ECU 30 performs the processes after step S105 as in the first embodiment.

According to the second embodiment, the following effects are obtainable in addition to the effects of the first embodiment.

If there are urea water crystals in the supply passage 14 that can cause clogging, the crystals can be dissolved by immersion of the crystals in urea water. Therefore, the ECU 30 opens the second supply valve 12 after a predetermined time (i.e. the third threshold value Th3) elapses from the closure of the first supply valve 11, and for urea water to flow into the second supply passage 14c, for starting filling of the second supply passage 14c with urea water. By waiting for a predetermined time, it allows urea water to reach the second supply valve 12. That is, the crystals existing in the second supply valve 12 or in the second supply passage 14c can be pre-immersed in urea water to dissolve in advance. Thereafter, by opening the second supply valve 12, urea water crystals that may cause clogging can be quickly eliminated. Further, by allowing the urea water to reach the second supply valve 12 in advance, the opening time the second supply valve 12 can be reducible, and the deterioration of the second supply valve 12 is suppressible.

The third threshold value Th3 (i.e., predetermined time) is changed according to urea water temperature. In such manner, it is possible to appropriately bring urea water to the second supply valve 12 (i.e., to allow urea water to reach the second supply valve 12) after closure of the first supply valve 11 and before opening of the second supply valve 12.

Further, the third threshold value Th3 (i.e., predetermined time) is set according to the volume difference between the first supply passage 14b and the second supply passage 14c. In such manner, it is possible to appropriately bring urea water to the second supply valve 12 (i.e., to allow urea water to reach the second supply valve 12) after closure of the first supply valve 11 and before opening of the second supply valve 12.

Other Embodiments

A part of the configuration of each of the above embodiments may be changed/modified as follows.

In the above embodiments, the timing of valve closing is determined by comparing the pressure value of urea water with the threshold values Th1 and Th2. However, the valve closing timing may be determined by comparing the pressure fluctuation amount of urea water with a threshold value. The timing may be determined. The urea water pressure change amount is an amount of change per unit time from the previous urea water pressure value.

Figure 9A:
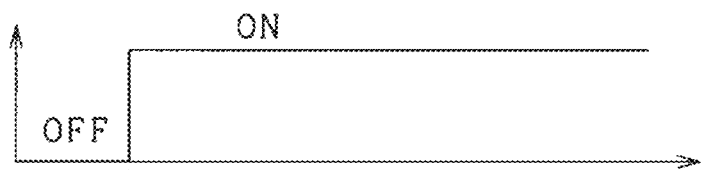
FIG. 9A is a time chart showing the drive state of a pump.
Figure 9B:
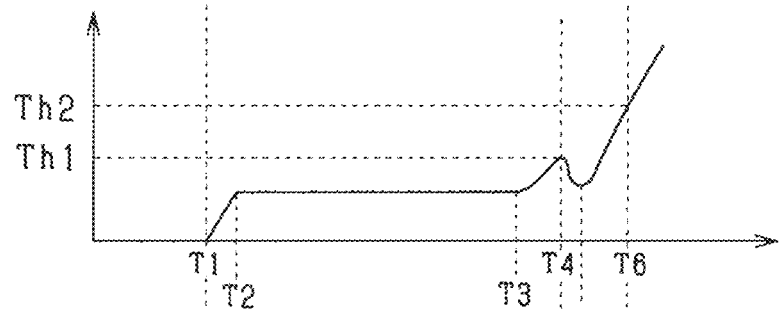
FIG. 9B is a time chart showing the urea water pressure value.
Figure 9C:
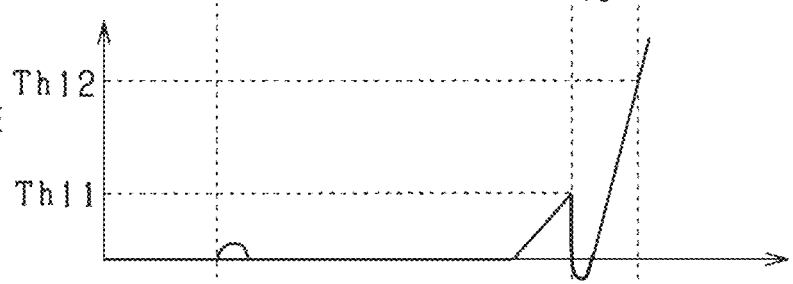
FIG. 9C is a time chart showing a pressure fluctuation amount of urea water.
Figure 9D:
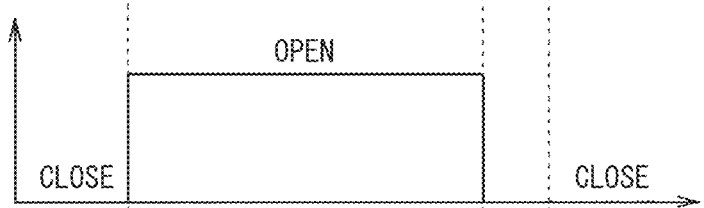
FIG. 9D is a time chart showing an open/close mode of the first supply valve.
Figure 9E:
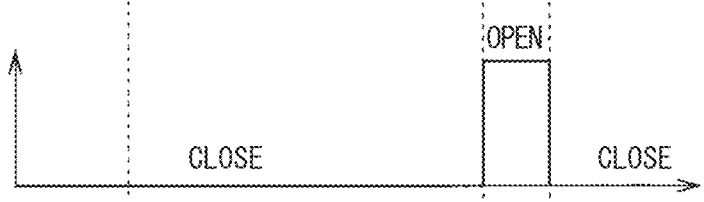
FIG. 9E is a time chart showing the open/close mode of the second supply valve.
Figure 9F:
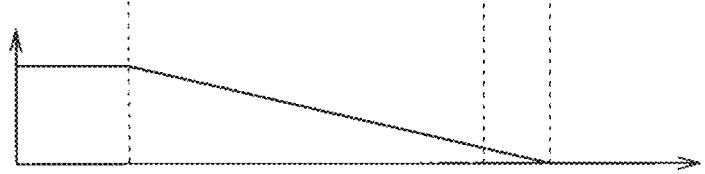
FIG. 9F is a time chart showing transition of the remaining air amount.

The effects of such comparison, i.e., when such modification example is performed, are described with reference to FIGS. 9A to 9F FIGS. 9A and 9B are the same drawings as those of FIGS. 5A and 5B. FIG. 9C is a time chart showing transition of the pressure fluctuation amount of urea water, FIGS. 9D to 9F are the same as those of FIGS. 5C to 5E, respectively.

As shown in FIGS. 9A to 9F, when the pump 15 is driven at timing T1 and the first supply valve 11 is opened, the pressure fluctuation amount of urea water (i.e., rise of the pressure) is caused by the start of filling the common passage 14a and the first supply passage 14b with urea water. However, since the pressure fluctuation becomes equal to or less than a first fluctuation threshold value Th11, the filling with urea water is continued as it is.

Note that the first fluctuation threshold value Th11 is a threshold value for the amount of pressure fluctuation for determining the closing timing of the first supply valve 11. The first fluctuation threshold value Th11 is changed by the ECU 30 according to urea water temperature and the urea water concentration for the same reason as in the first embodiment. The mode of changing the first threshold value Th11 is the same as that of the first embodiment.

Thereafter (i.e., after timing T2), the pressure becomes constant and the pressure fluctuation amount becomes zero. On the other hand, air is discharged from the supply passage 14 through the first supply valve 11, and the amount of remaining air in the supply passage 14 is reduced.

Thereafter, when the filling of urea water in the first supply valve 11 and the first supply passage 14b is complete (at timing T3), the pressure fluctuation amount of urea water increases. When the pressure fluctuation amount of urea water becomes equal to or greater than the first fluctuation threshold value Th11 of the pressure fluctuation (at timing T4), the first supply valve 11 is closed while the second supply valve 12 is opened. Therefore, the remaining air is pushed out from the second supply valve 12, and urea water flows into the second supply passage 14c, filling the second supply valve 12 and the second supply passage 14c with urea water.

Thereafter, when the filling of urea water in the second supply valve 12 and the second supply passage 14c is complete (at timing T5), the pressure fluctuation amount of the urea water increases. When the pressure fluctuation amount of urea water becomes greater than a second fluctuation threshold value Th12 of the pressure fluctuation amount (at timing T6), the second supply valve 12 is closed. In such manner, the filling of the supply passage 14 with urea water is complete.

Note that the second threshold value Th12 is a threshold value for the amount of pressure fluctuation for determining the closing timing of the second supply valve 12. The second threshold value Th12 is changed by the ECU 30 according to urea water temperature and the urea water concentration for the same reason as in the first embodiment. The mode of changing the second threshold value Th12 is the same as that of the first embodiment. Further, the second threshold value Th12 is set to a value greater than that of the first threshold value Th11. Such a configuration is based on a consideration that when filling of urea water in the second supply passage 14c is complete, since there is no remaining air, it is expected that the pressure fluctuation amount will change significantly as compared with the time when the filling of urea water in the first supply passage 14b is complete.

Further, in this alternative example, the second supply valve 12 is opened at the same time as the first supply valve 11 is closed. However, just like the second embodiment, the second supply valve 12 may be opened after the lapse of a predetermined time (i.e., after the third threshold value Th3) from the closure of the first supply valve 11.

By using/utilizing the amount of pressure fluctuation in such manner, even if the density changes due to a change in the temperature or concentration of urea water, influence of such change is preventable, and the determination of completion of the filling of urea water is accurately made. In addition, the influence of variation (i.e., detection error) caused by the pressure sensor 16 that serves as the pressure detector is suppressible.

In the above embodiments, the values Th1 and Th11 are changed according to urea water temperature and the urea water concentration. However, the threshold value may be kept unchanged. Similarly, the values Th2 and Th12 do not have to be changed according to urea water temperature and the urea water concentration. That is, it may have a fixed value. In such case, the urea water temperature sensor 17 and the urea water concentration sensor 18 may be omissible.

In the second embodiment described above, the third threshold value Th3 is changed according to urea water temperature. However, the third threshold value Th3 does not have to be changed in such manner. That is, it may have a fixed value. In such case, the urea water temperature sensor 17 may be omissible.

In the second embodiment described above, the third threshold value Th3 is changed according to the volume difference between the first supply passage 14b and the second supply passage 14c. However, the third threshold value Th3 does not have to be changed in such manner.

In the above embodiments, the first catalyst 21 and the second catalyst 22 are arranged in series. However, the two catalysts may be arranged in parallel. That is, the exhaust passages 20 from the internal combustion engine 10 may be provided in parallel, and the first catalyst 21 and the second catalyst 22 may be arranged respectively.

What is claimed is:

1. A urea water supply system provided in an exhaust passage of an internal combustion engine for supplying urea water, which is used in an exhaust gas purification device having first and second catalysts among which the first catalyst is a selective reduction type catalyst provided in the exhaust passage of the internal combustion engine and purifying nitrogen oxide in an exhaust gas using ammonia,
the urea water supply system comprising:
a first supply valve for supplying urea water to an upstream of the first catalyst in the exhaust passage;
a second supply valve for supplying urea water to an upstream of the second catalyst in the exhaust passage;
a urea water tank for storing urea water;
a supply passage provided to connect the urea water tank with each of the first supply valve and the second supply valve and through which the urea water passes;
a pump for pumping the urea water from the urea water tank to the supply passage;

a pressure detector that detects a pressure value of the urea water; and a controller for performing drive control of the pump and open/close control of the first supply valve and the second supply valve, wherein the supply passage is branched en route to the two valves, and includes:
  (i) a common passage extending from the urea water tank to a branch point,
  (ii) a first supply passage extending from the branch point to the first supply valve and connected to the first supply valve for supplying urea water to the first supply valve, and
  (iii) a second supply passage extending from the branch point to the second supply valve and connected to the second supply valve for supplying urea water to the second supply valve, a volume of the first supply passage is greater than a volume of the second supply passage, and the controller is configured to:
  (i) open the first supply valve and drives the pump to pump the urea water while keeping the second supply valve closed, thereby starting filling of the first supply passage and the common passage with the urea water,
  (ii) determine completion of filling of the first supply passage with urea water based on a pressure value detected by the pressure detector, and
  (iii) close the first supply valve upon detecting the completion of urea water filling in the first supply passage.

2. The urea water supply system of claim 1, wherein the controller is further configured to open the second supply valve at the same time as closing the first supply valve, such that the second supply passage starts filling with urea water.

3. The urea water supply system of claim 1, wherein the controller is further configured to, after closing the first supply valve, wait for a predetermined time therefrom, and then open the second supply valve to starting filling the second supply passage with urea water.

4. The urea water supply system of claim 3, wherein the predetermined time is set based, at least partly, on a volume difference between the first supply passage and the second supply passage.

5. The urea water supply system of claim 3, wherein the predetermined time is changed, at least partly, according to temperature of urea water.

6. The urea water supply system of claim 2, wherein the controller is configured to, after opening the first supply valve, close the first supply valve when the pressure value of the urea water detected by the pressure detector is equal to or higher than a first threshold value, the controller is configured to, after opening the second supply valve, close the second supply valve upon a determination that the pressure value of the urea water detected by the pressure detector is equal to or higher than a second threshold value, and the second threshold value is a value equal to or higher than the first threshold value.

7. The urea water supply system of claim 1, wherein the controller is configured to, after opening the first supply valve, closes the first supply valve when a pressure fluctuation amount of urea water detected by the pressure detector is equal to or greater than a first fluctuation threshold value, the controller is configured to, after opening the second supply valve, closes the second supply valve when a pressure fluctuation amount of urea water detected by the pressure detector is greater than a second fluctuation threshold value, and the second fluctuation threshold value is a value greater than the first fluctuation threshold value.

8. The urea water supply system of claim 6, wherein at least one of the first threshold value and the second threshold value is changed according to a value of at least one of a temperature of urea water and a concentration of urea water.

9. A controller for controlling a urea water supply system, wherein the urea water supply system includes: a urea water tank, a pump, a pressure sensor, a branch point, a common passage located between the pump and the branch point, a first supply valve, a first supply passage located between the branch point and the first supply valve and connected to the first supply valve for supplying urea water to the first supply valve, a second supply valve, and a second supply passage located between the branch point and the second supply valve and connected to the second supply valve for supplying urea water to the second supply valve, and wherein the controller comprises:

a processor; and a non-transitory computer-readable storage medium, and wherein the controller is configured to:

drive the pump;

open the first supply valve to cause the first supply valve to inject urea water supplied from the first supply passage while keeping the second supply valve closed thereby starting filling of the first supply passage and the common passage with the urea water;

determine that a pressure is greater than or equal to a first threshold value;

close the first supply valve;

open the second supply valve to cause the second supply valve to inject urea water supplied from the second supply passage;

determine that the pressure is greater than or equal to a second threshold value; and close the second supply valve.

10. The controller of claim 9, wherein:

a volume of the first passage is greater than a volume of the second passage, and the second threshold value is greater than the first threshold value.

11. The controller of claim 10, wherein:

the first threshold value varies at least partly based upon a urea water temperature, such that the first threshold value decreases as the urea water temperature increases, and the second threshold value varies at least partly based upon the urea water temperature, such that the second threshold value decreases as the urea water temperature increases.

12. The controller of claim 10, wherein:

the first threshold value varies at least partly based upon a urea water concentration, such that the first threshold value increases as the urea water concentration increases, and the second threshold value varies at least partly based upon the urea water concentration, such that the second threshold value increases as the urea water concentration increases.

13. The controller of claim 10, wherein:
the first supply valve is closed at substantially the same time that the second supply valve is opened.

14. The controller of claim 10, wherein:
the second supply valve is opened substantially after the first supply valve is closed.

15. The controller of claim 10, wherein the controller is further configured to:
determine that an elapsed time greater than or equal to a time threshold value has passed after the first supply valve is closed;
open the second supply valve;
determine that the pressure is greater than or equal to a second threshold value; and
close the second supply valve.

16. The controller of claim 15, wherein:
the time threshold value is based at least partly upon a piping volume difference, such that the time threshold value decreases as the piping volume difference increases.

17. The urea water supply system of claim 1, wherein
the first supply passage is directly connected to the first supply valve without passing though the branch point, and
the second supply passage is directly connected to the second supply valve without passing though the branch point.

18. The controller of claim 9, wherein:
the first supply passage is directly connected to the first supply valve without passing though the branch point, and
the second supply passage is directly connected to the second supply valve without passing though the branch point.

19. The urea water supply system of claim 1, wherein
the first supply valve, which is connected to first supply passage having the volume greater than the volume of the second supply passage, is provided upstream of the first catalyst;
the first catalyst and the second catalyst are both provided in the exhaust passage; and
the second catalyst is provided downstream of the first catalyst in series.

20. The controller of claim 9, wherein:
the first supply valve is configured to supply urea water to an upstream of a first catalyst in an exhaust passage;
the second supply valve is configured to supply urea water to an upstream of a second catalyst in the exhaust passage;
the first supply valve, which is connected to first supply passage having a volume greater than a volume of the second supply passage, is provided upstream of the first catalyst;
the first catalyst and the second catalyst are both provided in the exhaust passage; and
the second catalyst is provided downstream of the first catalyst in series.

21. A controller for controlling a urea water supply system, wherein the urea water supply system includes: a urea water tank, a pump, a pressure sensor, a branch point, a common passage located between the pump and the branch point, a first supply valve, a first supply passage located between the branch point and the first supply valve, a second supply valve, and a second supply passage located between the branch point and the second supply valve, and wherein the controller comprises:
a processor; and
a non-transitory computer-readable storage medium, and wherein the controller is configured to:
drive the pump;
open the first supply valve while keeping the second supply valve closed;
determine that a pressure is greater than or equal to a first threshold value;
close the first supply valve;
open the second supply valve;
determine that the pressure is greater than or equal to a second threshold value; and
close the second supply valve;
wherein a volume of the first passage is greater than a volume of the second passage, and the second threshold value is greater than the first threshold value; and
wherein:
(i) the first threshold value varies at least partly based upon a urea water temperature, such that the first threshold value decreases as the urea water temperature increases, and the second threshold value varies at least partly based upon the urea water temperature, such that the second threshold value decreases as the urea water temperature increases; or
(ii) the first threshold value varies at least partly based upon a urea water concentration, such that the first threshold value increases as the urea water concentration increases, and the second threshold value varies at least partly based upon the urea water concentration, such that the second threshold value increases as the urea water concentration increases.

* * * * *